(12) United States Patent
Murayama et al.

(10) Patent No.: US 10,947,163 B2
(45) Date of Patent: Mar. 16, 2021

(54) FOAM

(71) Applicant: NICHIAS CORPORATION, Tokyo (JP)

(72) Inventors: Kazutaka Murayama, Tokyo (JP); Osamu Horiuchi, Tokyo (JP); Kiyoshi Sato, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 104 days.

(21) Appl. No.: 15/546,983

(22) PCT Filed: Jan. 28, 2016

(86) PCT No.: PCT/JP2016/000446
§ 371 (c)(1),
(2) Date: Jul. 27, 2017

(87) PCT Pub. No.: WO2016/121400
PCT Pub. Date: Aug. 4, 2016

(65) Prior Publication Data
US 2018/0016195 A1    Jan. 18, 2018

(30) Foreign Application Priority Data

Jan. 28, 2015  (JP) .............................. JP2015-014662

(51) Int. Cl.
*C04B 38/10* (2006.01)
*C03C 13/00* (2006.01)
(Continued)

(52) U.S. Cl.
CPC .............. *C04B 38/10* (2013.01); *C03C 13/00* (2013.01); *C03C 25/40* (2013.01);
(Continued)

(58) Field of Classification Search
CPC ........ C03C 13/00; C04B 38/10; G10K 11/162
See application file for complete search history.

(56) References Cited

U.S. PATENT DOCUMENTS 3,865,661 A    2/1975  Hata et al.
4,374,202 A    2/1983  Zucker et al.
(Continued)

FOREIGN PATENT DOCUMENTS

CN    1944500 A    4/2007
CN    101798758 A    8/2010
(Continued)

OTHER PUBLICATIONS

Aug. 30, 3018 Extended European Search Report issued in European Patent Application No. 16743004.0.
(Continued)

*Primary Examiner* — Matthew E. Hoban
(74) *Attorney, Agent, or Firm* — Oliff PLC

(57) ABSTRACT

A foamed body that is a porous foamed body including inorganic fibers other than asbestos, and having a compressive stress when compressed at normal temperature at a compression ratio of 80% of 0.1 MPa or less and a recovery ratio when compressed at normal temperature at a compression ratio of 80% of 50% or more.

13 Claims, 1 Drawing Sheet

(51) Int. Cl.
*G10K 11/162* (2006.01)
*C04B 20/10* (2006.01)
*C03C 25/40* (2006.01)
*C04B 111/52* (2006.01)
*C04B 111/28* (2006.01)

(52) U.S. Cl.
CPC ........ *C04B 20/1051* (2013.01); *G10K 11/162* (2013.01); *C04B 2111/28* (2013.01); *C04B 2111/52* (2013.01)

(56) References Cited

U.S. PATENT DOCUMENTS

| | | | |
|---|---|---|---|
| 4,381,199 | A | 4/1983 | Graham |
| 8,476,330 | B2 | 7/2013 | Dimitroff |
| 2009/0018226 | A1 | 1/2009 | Dimitroff |
| 2015/0118481 | A1* | 4/2015 | Kodama ................ C08J 9/0028 428/317.3 |

FOREIGN PATENT DOCUMENTS

| | | | |
|---|---|---|---|
| CN | 101802044 | A | 8/2010 |
| CN | 102942668 | A | 2/2013 |
| CN | 103408859 | A | 11/2013 |
| CN | 104109365 | A | 10/2014 |
| DE | 1471361 | A1 | 6/1969 |
| FR | 1447089 | A | 7/1966 |
| GB | 722012 | A | 1/1955 |
| GB | 882296 | A | 11/1961 |
| GB | 1017473 | A | 1/1966 |
| GB | 1397308 | A | 6/1975 |
| JP | S48-92467 | A | 11/1973 |
| JP | S55-148133 | A | 11/1980 |
| JP | S59-70515 | A | 4/1984 |
| JP | S59-92983 | A | 5/1984 |
| JP | S60-141684 | A | 7/1985 |
| JP | S60-259414 | A | 12/1985 |
| JP | H05-162157 | A | 6/1993 |
| JP | 2013-163703 | A | 8/2013 |
| JP | 2014-12821 | A | 1/2014 |
| SU | 67-3636 | A1 | 7/1979 |

OTHER PUBLICATIONS

Mar. 15, 2016 Search Report issued in International Patent Application No. PCT/JP2016/000446.

Mar. 15, 2016 Written Opinion issued in International Patent Application No. PCT/JP2016/000446.

Dec. 11, 2018 Office Action issued in Japanese Patent Application No. 2016-571873.

Jan. 21, 2020 Office Action issued in Chinese Patent Application No. 201680007445.X.

Sep. 30, 2020 Office Action issued in Chinese Patent Application No. 201680007445.X.

Ma, et al. "Determination of the Nature of the Surfactant and its Content", published in "University Chemistry Experiments," pp. 120-121, Southeast University Press, Jul. 2002.

Li, et al. "Mechanism of Coupling Agents", published in "Polymeric Materials Auxiliaries," pp. 156-157, Chemical Industry Press, Sep. 2008.

* cited by examiner

FOAM

TECHNICAL FIELD

The invention relates to an inorganic fibrous foamed body.

BACKGROUND ART

An inorganic fibrous foamed body is produced by a method in which an aqueous dispersion of inorganic fibers is foamed, and the resulting bubble-containing aqueous dispersion is shaped, followed by drying. The inorganic fibrous foamed body has elasticity similar to that of foamed polyurethane or foamed polyethylene, and is light, has excellent thermal insulation performance and sound absorbing property and is nonflammable, and hence it can be used as a heat-insulating element for high-temperature portions of aircrafts, rockets, ships, various other industrial equipment, etc.

As inorganic fibers used for the production of this type of foamed body, asbestos fibers are most suitable due to its outstanding excellent properties in water dispersibility and entanglement properties. On the other hand, in recent years, due to environmental hygiene reasons, it became difficult to use asbestos fibers, so that it was necessary to produce an elastic foamed body using inorganic fibers other than asbestos fibers, even if they were difficult to use. In order to achieve this object, various proposals have been made (Patent Document 1).

However, when inorganic fibers other than asbestos fibers are used, dispersibility and entanglement properties are poor, and hence a foamed body produced are hard and have low resilience. Therefore, workability was poor, for example. There was room for improvement in terms of deformation characteristics such as flexibility and resiliency.

RELATED ART DOCUMENT

Patent Document

Patent Document 1: JP-A-S60-141684

SUMMARY OF INVENTION

An object of the invention is to provide a foamed body having excellent deformation characteristics.

As a result of extensive studies, the inventors of the invention have found that a foamed body having excellent deformation characteristics can be obtained without using asbestos as a raw material. The invention has been attained based on this finding.

According to the invention, a foamed body having the following embodiment is provided.

1. A foamed body that is a porous foamed body comprising inorganic fibers other than asbestos, and having at least one or more properties selected from the following properties (1) to (8):

(1) all of compressive stresses when compressed at normal temperature at each compression ratio in a range of compression ratio of 0 to 90% are 1 MPa or less;
(2) the compressive stress when compressed at normal temperature at a compression ratio of 80% is 0.1 MPa or less;
(3) the recovery ratio when compressed at normal temperature at a compression ratio of 80% is 50% or more;
(4) all of the recovery ratios when compressed at normal temperature at each compression ratio in a range of compression ratio of 0 to 90% are 80% or more;
(5) the apparent Young's modulus when compressed at nominal temperature at a compression ratio of 80% is 1 MPa or less;
(6) the apparent Young's modulus when compressed at normal temperature at a compression ratio of 80% is 0.05 MPa or less;
(7) the bulk density at normal temperature is 0.005 to 0.1 $g/cm^3$;
(8) a product [$MPa \cdot g/cm^3$] of the bulk density and the compressive stress at normal temperature at a compression ratio of 40 to 80% is 0.3 or less; and
(9) the product when compressed at normal temperature at a compression ratio of 80% is 0.005 or less.

2. The foamed body according to 1, wherein the inorganic fiber is glass fiber.

3. A method for producing an inorganic fibrous foamed body comprising:

charging the surface of inorganic fiber negatively or positively;

stirring a dispersion containing the charged inorganic fiber and a surfactant to allow it to foam, thereby to obtain a wet foamed body;

drying the wet foamed body; and imparting a coupling agent to the dried foamed body.

4. The method for producing an inorganic fibrous foamed body according to 3, wherein, when the surface of the inorganic fiber is negatively charged, a dispersion containing the charged inorganic fiber and a cationic surfactant is stirred to allow the dispersion to foam, thereby to obtain a wet foamed body, and when the surface of the inorganic fiber is positively charged, a dispersion containing the charged inorganic fiber and an anionic surfactant is stirred to allow the dispersion to foam, thereby to obtain a wet foamed body.

5. The method for producing an inorganic fibrous foamed body according to 3 or 4, wherein the surface of the inorganic fiber is negatively or positively charged by allowing it to contact with an alkaline or acidic treating liquid.

6. The method for producing an inorganic fibrous foamed body according to 5, wherein the dispersion contains the treatment liquid, and the dispersion is allowed to foam by stirring while contacting with the treatment liquid.

7. The method for producing an inorganic fibrous foamed body according to 5 or 6, wherein the inorganic fiber is opened, dispersed and charged in the treatment liquid in advance.

8. The method for producing an inorganic fibrous foamed body according to any one of 3 to 7, wherein, after the wet foamed body is dried and before the coupling agent is added, the foamed body is heated to remove the surfactant.

MODE FOR CARRYING OUT THE INVENTION

Figure 1:
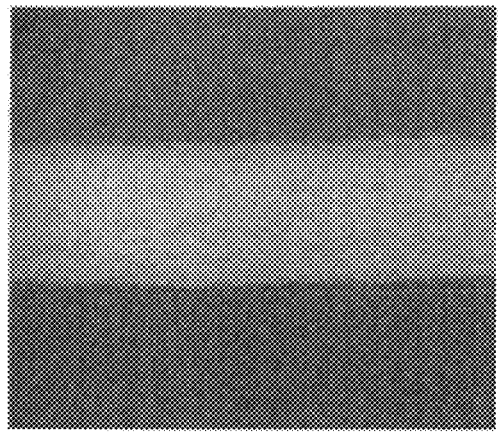
FIG. 1 is a photograph showing the cross section of a foamed body obtained in Example 1.

An embodiment of the foamed body of the invention will be explained. The characteristics described below are characteristics at normal temperature unless otherwise indicated. The foamed body of this embodiment is a porous body made of inorganic fibers.

The inorganic fibers of the embodiment are configured without containing asbestos fibers, and as the inorganic fibers, one or more selected from ceramic fibers, bio-soluble fibers (alkaline earth silicate fiber, rock wool, etc.) and glass fibers can be used.

For example, the bio-soluble inorganic fibers are inorganic fibers having a dissolution rate in a physiological saline solution at 40° C. of 1% or more.

The dissolution rate in a physiological saline solution is measured as follows, for example. Specifically, 1 g of a specimen prepared by grinding inorganic fibers to a dimension of 200 mesh or less and 150 ml of a physiological saline solution are put in a conical flask (volume: 300 mL). The conical flask is then placed in an incubator (40° C.). Horizontal vibrations (120 rµm) are continuously applied to the conical flask for 50 hours. The concentrations (mg/L) of elements, which may be main elements, e.g., silicon (Si), magnesium (Mg), calcium (Ca), sodium (Na), potassium (K) and aluminum (Al), contained in a filtrate obtained by filtration are each measured using an ICP optical emission spectrometer. The dissolution rate (%) in a physiological saline solution is calculated based on the concentrations of the elements thus measured and the contents (mass %) of the elements in the inorganic fibers before being dissolved. For example, when the measured elements are silicon (Si), magnesium (Mg), calcium (Ca), and aluminum (Al), the dissolution rate C (%) in a physiological saline solution is calculated by the following expression "C (%)=[amount (L) of filtrate×(a1+a2+a3+a4)×100]/[mass (mg) of inorganic fibers before being dissolved×(b1+b2+b3+b4)/100]". In the above expression, at a1, a2, a3 and a4 respectively indicate the measured concentrations (mg/L) of silicon, magnesium, calcium, and aluminum, and b1, b2, b3 and b4 respectively indicate the contents (mass %) of silicon, magnesium, calcium, and aluminum in the inorganic fibers before being dissolved.

The bio-soluble fibers have the following composition, for example.

Total of $SiO_2$, $ZrO_2$, $Al_2O_3$ and $TiO_2$ 50 wt % to 82 wt %

Total of an alkali metal oxide and an alkaline earth metal oxide 18 wt % to 50 wt %

The bio-soluble fibers may have the following composition, for example.

$SiO_2$ 50 to 82 wt %

Total of CaO and MgO 10 to 43 wt %

Although the average fiber diameter is not limited, the fiber is preferably thin. For example, it can be 0.08 µm to 4.0 µm, 0.1 µm to 2.0 µm, or 0.2 µm to 1.0 µm. The average fiber diameter can be determined from the fiber diameters measured for 100 randomly selected fibers.

The foamed body of the embodiment may comprise organic components in addition to inorganic components. On the other hand, of the all inorganic components, inorganic fibers account for 50 wt % to 100 wt %, for example. The inorganic fibers account for preferably 80 wt % or more, 90% wt % or more 96 wt % or more, or 97 wt % or more of the total inorganic components.

The foamed body of the embodiment may be configured without containing an inorganic binder such as boron oxide, boron nitride, metal boride, etc. as an inorganic component.

The foamed body of the embodiment may be configured without containing an organic binder as an organic component. Here, the organic binder may improve bulk density, compressive stress and compression recovery ratio at normal temperature, but it can be burnt down under high temperature conditions (for example, 450° C.), so that the bulk density, compressive stress, and compression recovery ratio may be lowered. That is, since the foamed body of this embodiment does not contain an organic binder, unlike a rock wool mat that includes an organic binder, for example, it can ensure bulk density, compressive stress, and compression recovery ratio without lowering even under high temperature conditions. It should be noted that the foamed body of the embodiment can also be configured with containing an organic binder.

In the foamed body of the embodiment, all of the compressive stresses when compressed at each compression ratio in a range of compression ratio of 0 to 90% at a normal temperature (5 to 35° C. according to JIS Z 8703) are preferably 2.0 MPa or less. For example, the compressive stress may be 1.5 MPa or less, 1.3 MPa or less, 1.0 MPa or less, 0.8 MPa or less, 0.6 MPa or less, 0.4 MPa or less, 0.2 MPa or less, 0.05 MPa or less, or 0.02 MPa or less. The lower limit is 0 MPa. More preferably, in the foamed body of the embodiment, all of the compressive stresses when compressed at each compression ratio in a range of compression ratio of 0 to 90% at high temperature (450° C.) are 2.3 MPa or less. For example, the compressive stress may be 2.0 MPa or less, 1.7 MPa or less, 1.5 MPa or less, 1.3 MPa or less, 1.0 MPa or less, 0.8 MPa or less, 0.6 MPa or less, 0.4 MPa or less, 0.2 MPa or less, or 0.04 MPa or less. The lower limit is 0 MPa.

In the foamed body of the embodiment, the compressive stress when compressed at a compression ratio of 80% at normal temperature (or all of the compressive stresses when compressed at each compression ratio in a range of compression ratio of 0 to 80%) is preferably 0.5 MPa or less. For example, the compressive stress is 0.3 MPa or less, 0.1 MPa or less, 0.08 MPa or less, 0.06 Pa or less, 0.04 Pa or less, 0.02 Pa or less, 0.01 MPa or less, 0.008 MPa or less, or 0.005 MPa or less. The lower omit is not limited, but it is normally 0.0001 MPa or more or 0.00001 MPa or more.

Here, in the foamed body, when the bulk density and the compressive stress are respectively high, the foamed body tends to be hard to have low resilience (restorability). On the contrary, in the foamed body of the embodiment, as described above, since the compressive stresses when compressing at each compression ratio in a range of compression ratio of 0 to 90% are all low, the flexibility can be increased and the deformation characteristics can be improved. Therefore, for example, it can easily fits an attachment portion to which the foamed body is attached, and the gap between the foamed body and the attachment portion is suppressed, whereby the sealing properties (workability) can be improved. More specifically, such foamed body can exhibit high flexibility from normal temperature to high temperature (e.g. 450° C.), the foamed body can easily fits an attachment portion to which it is attached, and the gap between the foamed body and the attachment portion is suppressed, whereby sealing properties from normal temperature to high temperature can be ensured and improved.

In the foamed body of the embodiment, the apparent Young's modulus at a compression ratio of 40 to 80% at room temperature is preferably 0.7 MPa or less. For example, the apparent Young's modulus can be 0.6 MPa or less, 0.3 MPa or less, 0.1 MPa or less, 0.05 MPa or less, or 0.01 MPa or less. The lower limit is not restricted, but is normally 0.0001 MPa or more. More preferably, the apparent Young's modulus at a compression ratio of 40 to 80% at a high temperature (450° C.) is 0.8 MPa or less. For example, the apparent Young's modulus can be 0.6 MPa or less, 0.1 MPa or less, 0.08 MPa or less, or 0.05 MPa or less. The lower limit is not restricted, but is normally 0.0001 MPa or more. Further preferably, in the foamed body of the embodiment, the apparent Young's modulus when compressed at each compression ratio in a range of compression ratio of 0 to 90% at normal temperature and high temperature (450° C.) is low as given above. As mentioned above, in the foamed body of the embodiment, since the apparent Young's modulus is low, exibility can be high and deformation characteristics can be improved.

Here, the apparent Young's modulus in the invention is a value obtained by dividing the compressive stress when compressed at a predetermined compression ratio by the above-mentioned prescribed compression ratio, assuming that the compression ratio is the amount of strain.

In the foamed body of the embodiment, the apparent Young's modulus at normal temperature at a compression ratio of 80% is preferably 0.7 MPa or less. For example, the apparent Young's modulus can be 0.6 MPa or less, 0.3 MPa or less, 0.1 MPa or less, 0.05 MPa or less or 0.01 MPa or less. The lower limit is not restricted, but is normally 0.0001 MPa or more.

In the foamed body of the embodiment, the bulk density (normal temperature, compression ratio 0%) is preferably 0.001 to 0.13 g/cm$^3$. For example, the bulk density can be 0.002 to 0.12 g/cm$^3$, 0.003 to 0.1 g/cm$^3$, 0.004 to 0.09 g/cm$^3$, 0.005 to 0.08 g/cm$^3$ or 0.006 to 0.05 g/cm$^3$. If the bulk density is within the above-mentioned range, the flexibility can be high, whereby the deformation characteristics can be improved.

In the foamed body of this embodiment, the product [MPa·g/cm$^3$] of bulk density and compressive stress at a compression ratio of 40 to 80% or at a compression ratio of 80% is preferably 0.30 or less. More preferably, the above-mentioned product [MPa·g/cm$^3$] is 0.28 or less. For example, the product can be 0.1 or less, 0.05 or less, 0.01 or less, 0.001 or less, or 0.0005 or less. When the product [MPa·g/cm$^3$] of the bulk density and the compressive stress is low, the bulk density and the compressive stress of the foamed body can be lowered, and the foamed body not only is soft but also has high resilience.

In the foamed body of the embodiment, the average circle equivalent diameter of the pore diameter is preferably 150 μm to 1000 μm. For example, the circle equivalent diameter of the pore diameter can be 180 μm to 800 μm, 200 μm to 700 μm, or 250 μm to 600 μm. When the average circle equivalent diameter of the pore diameter is within the above range, the recovering force after compression is secured (in other words, the compression recovery ratio is ensured and adjusted) while maintaining the structural strength, whereby the sealing property can be ensured and improved. Further, since the average circle equivalent diameter of the pore diameter is small, it is possible to suppress heat conduction by convection to improve heat insulating property, as well as to improve sealing performance by increasing the pressure loss. The average circle equivalent diameter of the pore diameter can be adjusted by the foaming magnification, the amount of bubbles, the bubble diameter, etc. at the time of foaming.

The compressive stress, the bulk density, the apparent Young's modulus, and the average circle equivalent diameter can be adjusted by, for example, the surface active treatment method for inorganic fibers, the concentration (content ratio) of inorganic fibers, the foaming magnification, the amount of bubbles, the bubble diameter, etc.

The foamed body of the embodiment preferably has a recovery ratio of 50% or more when compressed at a compression ratio of 80% (preferably 0 to 90%) at normal temperature. For example, the recovery ratio can be 60%, 70%, 80% or more, 85% or more, 90% or more, or 95% or more. The upper limit is not limited, but is normally 99% or less. More preferably, the recovery ratio when compressed at a compression ratio of 80% (preferably 0 to 90%) at high temperature (450° C.) is 50% or more. For example, the recovery ratio can be 60%, 70%, 80% or more, 85% or more, 90% or more, or 95% or more. The upper limit is not limited, but is normally 99% or less.

Preferably, the foamed body of the embodiment has a recovery ratio of 87% or more (more preferably 90% or more) at normal temperature when compressed at a compression ratio of 40%. The upper limit is not limited, but it is normally 99% or less.

With such a foamed body, since the recovery ratio is high, the recovering property can be enhanced and the deformation characteristics can be improved. More specifically, the foamed body can easily fits an attachment portion to which the foamed body is attached and the gap between the foamed body and the attachment portion can be suppressed to ensure and improve the sealing property from normal temperature to high temperature.

The foamed body of the invention can possess the above-mentioned properties in arbitrary combination.

For the foamed body of the invention as mentioned above, air bubbles are formed by the method described later. Therefore, the foamed body of the above embodiment can be configured not to contain fluoromica or gum arabic that promotes bubble formation. As a different embodiment, it is also possible to configure the foamed body such that it comprises fiuoromica or gum arabic.

Next, a method for producing the inorganic fibrous foamed body of the above embodiment will be described. The production method comprises a preparation step of preparing an inorganic fiber dispersion, a foaming step of foaming the inorganic fiber dispersion, a dehydration step of drying the foamed body (step of removing a dispersion medium) and a coupling agent imparting step of imparting a coupling agent. In order to promote adhesion of a coupling agent, a firing step in which the foamed body is fired at a prescribed temperature may be added prior to conducting the coupling agent imparting step.

One embodiment of the preparation step includes a charging step of bringing the surface of the inorganic fiber into contact with an alkaline or acidic treatment liquid to make the surface of the inorganic fiber to be negatively or positively charged and a surfactant addition step of adding a surfactant to the charged inorganic fiber to prepare a dispersion. When the surface of the inorganic fiber is negatively charged, it is preferable to add a cationic surfactant or when the surface of the inorganic fiber is positively charged, it is preferable to add an anionic surfactants.

In the charging step, by adjusting pH by using an alkaline or acidic treating liquid, the zeta potential of the surface of the inorganic fiber is controlled. Specifically, the zeta potential of the surface of the inorganic fiber is allowed to be negative or positive.

In the surfactant adding step, preferably, a surfactant having a hydrophilic group with an opposite sign to that of the charged inorganic fibers is added to the fibers, and the hydrophilic group of the surfactant is adsorbed on the surface of the inorganic fiber to cause a hydrophobic group to be disposed on the side opposite to the surface of the inorganic fiber, thereby to render the inorganic fiber (outermost surface) hydrophobic. When foaming is conducted by introducing air in the foaming step mentioned later in a state that the surface of the inorganic fiber is hydrophobic by absorbing the surfactant as mentioned above, formation of bubbles is promoted on the hydrophobic group side in the surface of the inorganic fiber, whereby a foamed body in a good foamed state can be obtained. In other words, by controlling the zeta potential of the surface of the inorganic fiber; a surfactant is interacted with the inorganic fiber to render the fiber hydrophobic and thus bubbles easily adhere to around the inorganic fiber for forming a foamed body (spongy structure).

For the inorganic fibers, ceramic fibers, bio-soluble fibers (alkaline earth silicate fibers, rock wool, etc.), glass fibers or the like can be used. The treatment liquid may be any one as long as it can be dissolved in water to change pH. An acid or a base of an inorganic compound, an acid or a base of an organic compound can be used. For example, the zeta potential of the surface of the inorganic fiber shows a value that is not zero, such as −5 mV to 70 mV, −7 mV to −60 mV, −10 mV to −45 mV, +5 mV to +65 mV, +7 mV to +60 mV or +10 mV to +45 mV. Depending on the type of fiber; the pH to achieve a given zeta potential will vary, and hence, preferable pH cannot be specified to one value. As for pH, for example, negative charging is possible at a pH of 7.5 to 13, and positive charging is possible at a pH of 2 to 6. The zeta potential can be obtained by dispersing the fibers in an aqueous dispersion medium adjusted to have a predetermined pH and measuring by using a general-purpose zeta potential meter (for example, Model FPA, manufactured by AFG Analytik).

The charging step and the surfactant-addition step in the preparation step can be carried out periodically or simultaneously. When the charging step and the surfactant-addition step are simultaneously conducted, the treatment liquid, the inorganic fiber and the surfactant can be mixed together. On the other hand, when the charging step and the surfactant-addition step are carried out periodically, the inorganic fibers can be opened, dispersed and charged in advance in the treatment liquid, and then mixed with a surfactant. Further, in another embodiment of the preparing step, without using a surfactant, a dispersion can be prepared by putting inorganic fibers having their surfaces at least hydrophobized by a surface treatment with an amphiphilic substance, a silane coupling agent having a hydrophobic functional group, a titanium coupling agent having a hydrophobic functional group or the like in a dispersion liquid (dispersion medium). The coupling agent in this step is used for bringing the inorganic fibers into a hydrophobic state to form a foamed body. The coupling agent used in the later coupling agent imparting step is for preventing the form of the foamed body from collapsing due to wetting with water.

The amount of the surfactant in the dispersion can be appropriately adjusted depending on the inorganic fiber, but for example, the surfactant may be used in an amount of 0.01 to 1.0 parts by weight relative to 100 parts by weight of the glass fiber. The amount of the surfactant can preferably be 0.1 to 0.8 parts by weight, more preferably 0.2 to 0.7 parts by weight. If the amount of the surfactant is too small, the surface of the inorganic fiber cannot be sufficiently rendered hydrophobic and the foaming property may be lowered. On the other hand, if the amount of the surfactant is too large, the surfactants adhere to each other, and the surface of the inorganic fiber may not be sufficiently hydrophobized. The amount of surfactant can be adjusted in this view point.

Also, the dispersion may be composed without containing organic binders (resin emulsion, rubber (elastomer) component (gum arabic etc.)) or magnesium oxide or hydroxide.

In the foaming step, air (air bubbles) is (are) supplied from a bubble supplying device to the inorganic fiber dispersion liquid in which the treatment liquid, the inorganic fibers, and the surfactant are mixed, thereby to allow the dispersion to foam. Air (air bubbles) may be supplied to the inorganic fiber dispersion liquid by stirring, thereby to allow the dispersion to foam without using a bubble supplying device. By such a bubble supplying device or stirring, foaming magnification, bubble amount, and bubble diameter can be adjusted.

In the dehydrating step, the foamed body is dehydrated by drying (including natural drying) the dispersion medium contained in the dispersion at normal temperature or a prescribed temperature other than normal temperature for a predetermined time (for example, 4 hours).

In the firing step, the foamed body is fired at a high temperature (for example, 450° C.) to remove the surfactant. The firing step can be carried out simultaneously with the dehydration step.

In the coupling agent imparting step, the foamed body, the coupling agent and water vapor are reacted to allow the foamed body to be imparted with the coupling agent. Specifically, vapor generated by heating the coupling agent is adhered to the foamed body, and allow the foamed body to react with water vapor. By treating with water vapor, the coupling agent is hydrolyzed, condensed by dehydration, and adheres to the foamed body. For example, the foamed body and the vapor of the coupling agent are brought into contact with each other in a closed container (airtight container into which no gas is mixed from the outside but the inside pressure can be increased by heating the inside). After contacting, water is put in the closed container to allow water vapor to be generated, and the water vapor is allowed to be reacted with a coupling agent. When a large amount of a coupling agent is imparted, instead of or in addition to the above-mentioned treatment, heating may be conducted after impregnating the foamed body directly with the coupling agent. Thereafter, the foamed body is in contact with water vapor.

Examples of the coupling agent include a silane coupling agent and a titanium coupling agent. Methyltriethoxysilane and the like can be given as a silane coupling agent. The amount of the coupling agent can be appropriately adjusted depending on the inorganic fiber, but it is about 1 to 10 wt %, for example.

The foamed body of the invention may essentially consist of or consist of inorganic fibers, a surfactant and a coupling agent; or may essentially consist of or consist of inorganic fibers and a coupling agent. The "essentially consist of" means that these are 95 wt % or more, 98 wt % or more or 99 wt % or more of the foamed body. Further, 96 wt % or more, 97 wt % or more, 98 wt % or more or 99 wt % or more of the foamed body may be inorganic fibers.

EXAMPLES

Hereinbelow, specific examples will be given. The invention is not limited to these examples.

Example 1

The micro glass fibers (average fiber diameter: 0.4 µm) were treated by adjusting the zeta potential of the fiber surface to be −55 my by dispersing them in aqueous ammonia of pH 10 such that the concentration thereof became 0.5 wt %. Subsequently, 0.5 parts by weight (in terms of solid matter of surfactant) of a cationic surfactant (lauryltrimethylammonium chloride (trade name; QUARTAMIN 24P, manufactured by Kao Corporation)) was added relative to 100 parts by weight of the fiber, followed by mixing and stirring. At this time, air was incorporated to allow the dispersion to foam. The thus obtained wet foamed body was dried and treated at 450° C. for 1 hour in an electric furnace to remove the surfactant adhering to the foamed body. Next, a coupling agent was imparted. As a coupling agent, methyltriethoxysilane (trade name: KBE-13, manufactured by Shin-Etsu Chemical Co., Ltd.) was used. A silane coupling agent was placed in a sealed container and heated to about 160° C. to allow vapor of the silane coupling agent to be generated, and the foamed body was treated with the vapor for 4 hours. Next, in order to proceed the reaction of the coupling agent, 8 g of water was added into the closed container to allow water vapor to be generated, and the foamed body was treated for 2 hours. Further, in the closed container, a coupling agent of about 10 g per 1 g of the foamed body weight was directly applied and heated at 105° C. for 4 hours. Thereafter, in the same manner as mentioned above, water in an amount corresponding to halt the mass of the coupling agent was placed in the container and treated at 108° C. for 2 hours. The average equivalent circle diameter of the foamed body pore diameter at room temperature (20° C.) in an uncompressed state was about 257 μm.

A photograph of a cross section of the obtained foamed body is shown in FIG. 1. The foamed body was evaluated for the following evaluation items. The results are shown in Table 1. In addition to the following evaluation items, the thus obtained foamed body was also excellent in terms of thermal conductivity (heat insulating property) and sound absorbing property.

(1) Product of Bulk Density and Compressive Stress

Calculation was conducted by multiplying the following bulk density and the compressive stress.

(a) Bulk Density

A sample was cut out from the prepared foamed body and the dimensions, i.e. the length, the width and the height, were measured by using a dimension measuring device (e.g. a caliper). Next, the weight of the sample was measured and the bulk density was measured by the following formula:

Bulk density (g/cm³)=weight÷length÷width÷height (b) Compressive Stress

As shown by the following formula, compressive stress was calculated by dividing a load value with which a sample was compressed in the test by the area (length and width) obtained by the sample dimension measurement. The load value was obtained as follows. The dimension of a sample was measured as in the case of the bulk density mentioned above, and 0 to 90% of compression ratio was set relative to 100% of the measured thickness. The load at the time of compression was a load value with which the sample was compressed to a certain thickness (2 mm/min) by using a material testing machine (Autograph, manufactured by Shimadzu Corporation).

Compression stress N/m²=measured load (N)÷area of sample (m²)

(2) Recovery Ratio

The dimension of the sample was measured in the same manner as in the case of the bulk density as mentioned above. The compression ratio was set (0 to 90%) taking the thickness of this sample as 100%, and the sample was compressed (2 mm/min) to a prescribed thickness by using a material testing machine (Autograph, manufactured by Shimadzu Corporation). The thickness of the sample after the completion of the test was measured, and the recovery ratio was calculated from the following formula:

Recovery ratio (%)=Thickness after compression test÷Thickness before compression test×100

(3) Circle Equivalent Diameter of Pore Diameter

A sample was cut out from the prepared foamed body and the cross section was photographed at a magnification of 20 by using a microscope (MODEL KH2200 manufactured by Hirox Corporation). All pores (12 to 332) in the photograph taken were measured by an image analysis software ImageProPlus (manufactured by Media Cybernetics, Inc.). In the measurement, since the portion recognized as a pore was in an elliptical shape, the long diameter and the short diameter of the pore were measured, and the cross sectional area was calculated by the following formula:

Cross sectional area of pore=long diameter÷2×short diameter÷2×π

In addition, the diameter corresponding to a diameter of a perfect circle was calculated from the cross-sectional area as a circle equivalent diameter by the following equation. Then, the average of circle equivalent diameters of all the pores in the photograph was calculated.

Circle equivalent pore diameter=2×√(pore cross sectional area÷π)

(4) Apparent Young's Modulus

An apparent Young's modulus was calculated based on the compressive stress and the amount of strain measured by the sample dimension measurement.

(5) Sealing Property

A sample was prepared by punching the foamed body into a ring having an inner diameter of 15 mm and an outer diameter of 30 mm. The sample and spacer were disposed between a pair of holding parts, and clamped by bolts such that the sample had a thickness corresponding to a prescribed compression ratio (0 to 90%). $N_2$ gas was flown from a $N_2$ cylinder into one inside of the pair of holding parts such that the gas penetrated the sample with 20 kPa of gas pressure adjusted by a differential pressure gauge. The flow amount of the $N_2$ gas in the system was measured by a flow meter installed in the other inside of the pair of holding parts. The flow amount of the $N_2$ gas thus measured was taken as the quantity L/min·mm of $N_2$ gas leaked from another cross section of the holding parts.

Example 2

Ceramic fibers (alumina about 50 wt %, silica about 50 wt %) (average fiber diameter: 2.0 μm) were treated by adjusting the zeta potential of the fiber surface to be −32 my by dispersing them in aqueous ammonia of pH 10 such that the concentration thereof became 2 wt %. Subsequently, 0.5 parts by weight (in terms of solid matter of surfactant) of a cationic surfactant (laurytrimethylammonium chloride (trade name: QUARTAMIN 24P, manufactured by Kao Corporation)) was added relative to 100 parts by weight of the fiber, followed by mixing and stirring. At this time, air was incorporated to allow the dispersion to foam. The resulting foamed body was subjected to drying, firing and coupling agent imparting treatment in the same manner as in Example 1. The average circle equivalent diameter of the pore diameter of the foamed body at normal temperature in a non-compression state was about 312 μm. For the resulting foamed body, evaluation was conducted in the same manner as in Example 1. The results are shown in Table 2.

Example 3

A foamed body was prepared and evaluated in the same manner as in Example 1, except that an anionic surfactant (sodium laurylbenzenesulfonate (trade name: NEOPEREX G65, manufactured by Kao Corporation)) was used instead of the cationic surfactant. The results are shown in Table 3.

Example 4

A foamed body was prepared and evaluated in the same manner as in Example 2, except that an anionic surfactant (sodium laurylbenzenesulfonate (trade name: NEOPEREX G65, manufactured by Kao Corporation)) was used instead of the cationic surfactant. The results are shown in Table 4.

Comparative Example 1

A dispersion of fibers was prepared in the same manner as in Example 1. The dispersion was then subjected to dehydration and drying without conducting zeta potential adjustment on the fiber surface and foaming. The average circle equivalent diameter of the pore diameter of the resulting un-foamed body (not compressed at normal temperature) was about 143 μm.

Figure 2:
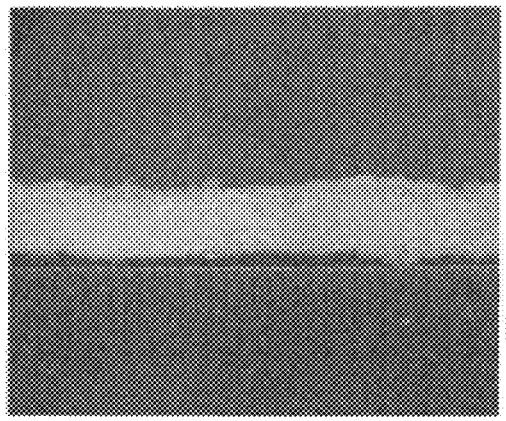
FIG. 2 is a photograph showing the cross section of a foamed body obtained in Comparative Example 1.

The photograph of the cross section of the resulting un-foamed body is shown in FIG. 2. Further, for the un-foamed body, evaluation was conducted in the same manner as in Example 1. The results are shown in Table 5.

Comparative Example 2

A foamed body was prepared in the same manner as in Example 1, except that no coupling agent was imparted. The resulting foamed body was brittle, and hence could not be evaluated.

TABLE 1

| | Example 1 | | | | | | | | | | |
|---|---|---|---|---|---|---|---|---|---|---|---|
| | Normal Tempature | | | | | | At the time of heating at 450° C. | | | | |
| Compression ratio (%) | Bulk density (g/cm) | Compressive stress (Pa) | Bulk density × Compressive stress (MPa · g/cm$^3$) | Recovery ratio (%) | Apparent Young's modules (Pa) | Sealing property at 20 kPa (L/min · mm) | Bulk density (g/cm$^3$) | Compressive stress (Pa) | Bulk density × Compressive stress (MPa · g/cm$^3$) | Recovery ratio (%) | Apparent Young's modules (Pa) | Sealing property at 20 kPa (L/min · mm) |
| 0 | 0.008 | 0 | 0 | 100 | — | 30.1 | 0.010 | 0 | 0 | 100 | — | 28.4 |
| 20 | 0.010 | 1,414 | 1.4 × 10$^{-5}$ | 97.8 | 7,070 | 28.8 | 0.014 | 1,998 | 2.8 × 10$^{-5}$ | 96.8 | 9,990 | 22.1 |
| 40 | 0.016 | 1,840 | 2.9 × 10$^{-5}$ | 92.3 | 4,599 | 25.7 | 0.024 | 3,494 | 8.4 × 10$^{-5}$ | 95.9 | 8,735 | 20.4 |
| 60 | 0.024 | 2,203 | 5.3 × 10$^{-6}$ | 95.1 | 3,971 | 20.2 | 0.041 | 5,544 | 2.3 × 10$^{-4}$ | 95.5 | 9,240 | 16.5 |
| 80 | 0.050 | 4,036 | 2.0 × 10$^{-4}$ | 96.6 | 5,045 | 14.7 | 0.073 | 12,573 | 9.2 × 10$^{-4}$ | 95.7 | 15,716 | 9.5 |
| 90 | 0.100 | 13,253 | 1.3 × 10$^{-3}$ | 93.2 | 14,725 | 4.1 | 0.168 | 44,332 | 7.4 × 10$^{-3}$ | 91.1 | 49,258 | 3.8 |

TABLE 2

| | Example 2 | | | | | | | | |
|---|---|---|---|---|---|---|---|---|---|
| | Normal Tempature | | | | | At the time of heating at 450° C. | | | |
| Compression ratio (%) | Bulk density (g/cm$^3$) | Compressive stress (Pa) | Bulk density × Compressive stress (MPa · g/cm$^3$) | Apparent Young's modules (Pa) | Bulk density (g/cm) | Compressive stress (Pa) | Bulk density × Compressive stress (MPa · g/cm$^3$) | Apparent Young's modules (Pa) |
| 0 | 0.054 | 0 | 0 | — | 0.051 | — | — | — |
| 20 | — | — | — | — | — | — | — | — |
| 40 | 0.101 | 3,605 | 3.6 × 10$^{-4}$ | 9013 | 0.104 | 4,037 | 4.2 × 10$^{-4}$ | 10,091 |
| 60 | 0.131 | 7,214 | 9.5 × 10$^{-4}$ | 12024 | 0.142 | 8,104 | 1.2 × 10$^{-3}$ | 13,509 |
| 80 | 0.250 | 36,181 | 9.0 × 10$^{-3}$ | 45226 | 0.285 | 49,779 | 1.4 × 10$^{-2}$ | 62,224 |
| 90 | 0.517 | 457,363 | 2.4 × 10$^{-1}$ | 508181 | 0.500 | 546,184 | 2.7 × 10$^{-1}$ | 606,871 |

TABLE 3

| | Example 3 Normal temperature | | | | |
|---|---|---|---|---|---|
| Compression ratio (%) | Bulk density (g/cm$^3$) | Compressive stress (Pa) | Bulk density × Compressive stress (MPa · g/cm$^3$) | Apparent Young's modulus (Pa) | Recovery ratio (%) |
| 0 | — | — | — | — | — |
| 20 | — | — | — | — | — |
| 40 | 0.044 | 4,180 | 1.8 × 10$^{-4}$ | 10,450 | 91.4 |
| 60 | 0.066 | 7,762 | 5.1 × 10$^{-4}$ | 12,937 | 79.7 |
| 80 | 0.131 | 40,649 | 5.3 × 10$^{-3}$ | 50,812 | 73.3 |
| 90 | 0.262 | 165,719 | 4.3 × 10$^{-2}$ | 184,132 | — |

TABLE 4

| | Example 4 Normal temperature | | | | |
|---|---|---|---|---|---|
| Compression ratio (%) | Bulk density (g/cm$^3$) | Compressive stress (Pa) | Bulk density × Compressive stress (MPa · g/cm$^3$) | Apparent Young's modulus (Pa) | Recovery ratio (%) |
| 0 | — | — | — | — | — |
| 20 | — | — | — | — | — |
| 40 | 0.075 | 4,442 | 3.3 × 10$^{-4}$ | 11,106 | 88.6 |
| 60 | 0.113 | 12,267 | 1.4 × 10$^{-3}$ | 20,445 | 80.1 |
| 80 | 0.225 | 82,495 | 1.9 × 10$^{-2}$ | 103,118 | 55.2 |
| 90 | — | — | — | — | — |

TABLE 5

| | Comparative Example 1 | | | | | | | | | | | |
|---|---|---|---|---|---|---|---|---|---|---|---|---|
| | Normal Tempature | | | | | | At the time of heating at 450° C. | | | | | |
| Compression ratio (%) | Bulk density (g/cm$^3$) | Compressive stress (Pa) | Bulk density × Compressive stress (MPa · g/cm$^3$) | Recovery ratio (%) | Apparent Young's modules (Pa) | Sealing property at 20 kPa (L/min · mm) | Bulk density (g/cm$^3$) | Compressive stress (Pa) | Bulk density × Compressive stress (MPa · g/cm$^3$) | Recovery ratio (%) | Apparent Young's modules (Pa) | Sealing property at 20 kPa (L/min · mm) |
| 0 | 0.146 | 0 | 0 | 100 | — | 33.1 | 0.106 | 0 | 0 | 100 | — | 35.7 |
| 20 | 0.161 | 6211 | 1.0 × 10$^{-3}$ | 38.8 | 31,055 | 30.5 | 0.124 | 7,731 | 9.6 × 10$^{-2}$ | 93.4 | 38,655 | 32.1 |
| 40 | 0.178 | 27912 | 5.0 × 10$^{-3}$ | 84.7 | 69,780 | 25.1 | 0.162 | 35,269 | 5.7 × 10$^{-3}$ | 89.6 | 88,172 | 28.9 |
| 60 | 0.267 | 77267 | 2.1 × 10$^{-2}$ | 90.1 | 128,778 | 22 | 0.220 | 87,894 | 1.9 × 10$^{-2}$ | 88.8 | 146,489 | 25.7 |
| 80 | 0.534 | 613321 | 3.3 × 10$^{-1}$ | 65.0 | 766,651 | 19.8 | 0.478 | 721,650 | 3.4 × 10$^{-1}$ | 83.1 | 902,062 | 22.6 |
| 90 | 1.069 | 2155794 | 2.3 | 75.8 | 2,395,327 | 13.7 | 1.026 | 2,427,337 | 2.5 | 77.1 | 2,697,041 | 15.8 |

INDUSTRIAL APPLICABILITY

The foamed body of the invention can be used as a sealing material, a sound-absorbing material, or the like, for example.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A foamed body that is a porous foamed body comprising inorganic fibers other than asbestos and having: (i) a compressive stress of 0.1 MPa or less when the foamed body is compressed at normal temperature at a compression ratio of 80% and (ii) a recovery ratio of 50% or more when the foamed body is compressed at normal temperature at a compression ratio of 80%,
wherein:
the foamed body is an inorganic fibrous foamed body, and
the foamed body is obtained by treating either a dried foamed body or a fired foamed body with a silane coupling agent or a titanium coupling agent.

2. The foamed body according to claim 1, wherein the foamed body has an apparent Young's modulus of 1 MPa or less when compressed at normal temperature at a compression ratio of 80%.

3. The foamed body according to claim 1, wherein the foamed body has a bulk density of from 0.005 to 0.1 g/cm$^3$ at normal temperature.

4. The foamed body according to claim 1, wherein a product [MPa·g/cm$^3$] of a bulk density and a compressive stress when the foamed body is compressed at normal temperature at a compression ratio of from 40 to 80% is 0.3 or less.

5. The foamed body according to claim 1, wherein the inorganic fibers are glass fibers.

6. The foamed body according to claim 1, wherein:
all recovery ratios are 80% or more when the foamed body is compressed at normal temperature at each compression ratio in a range of from 0 to 90%.

7. The foamed body according to claim 1, wherein the inorganic fibers make up 96 wt % or more of the foamed body.

8. The foamed body according to claim 1, wherein the inorganic fibers and the silane coupling agent or the titanium coupling agent make up 95 wt % or more of the foamed body.

9. A method for producing the foamed body according to claim 1, the method comprising:
charging a surface of the inorganic fibers negatively or positively;
stirring a dispersion containing the charged inorganic fibers and a surfactant to allow the dispersion to foam and form a wet foamed body;
drying the wet foamed body; and
treating the dried foamed body with the silane coupling agent or the titanium coupling agent.

10. The foamed body according to claim 5, wherein the silane coupling agent is used.

11. The foamed body according to claim 10, wherein the silane coupling agent is methyltriethoxysilane.

12. The foamed body according to claim 11, wherein the foamed body is obtained by treating a fired foamed body.

13. The foamed body according to claim 12, wherein the treating the fired foamed body with methyltriethoxysilane includes: (i) contacting the fired foamed body with methyltriethoxysilane, (ii) and then contacting the fired foamed body from (i) with water vapor.

* * * * *